INVENTORS.
Harry H. Britcher, Jr. and
Louis Chalmer Buterbaugh
By Donald G. Dalton
Attorney United States Patent Office 3,266,649
Patented August 16, 1966

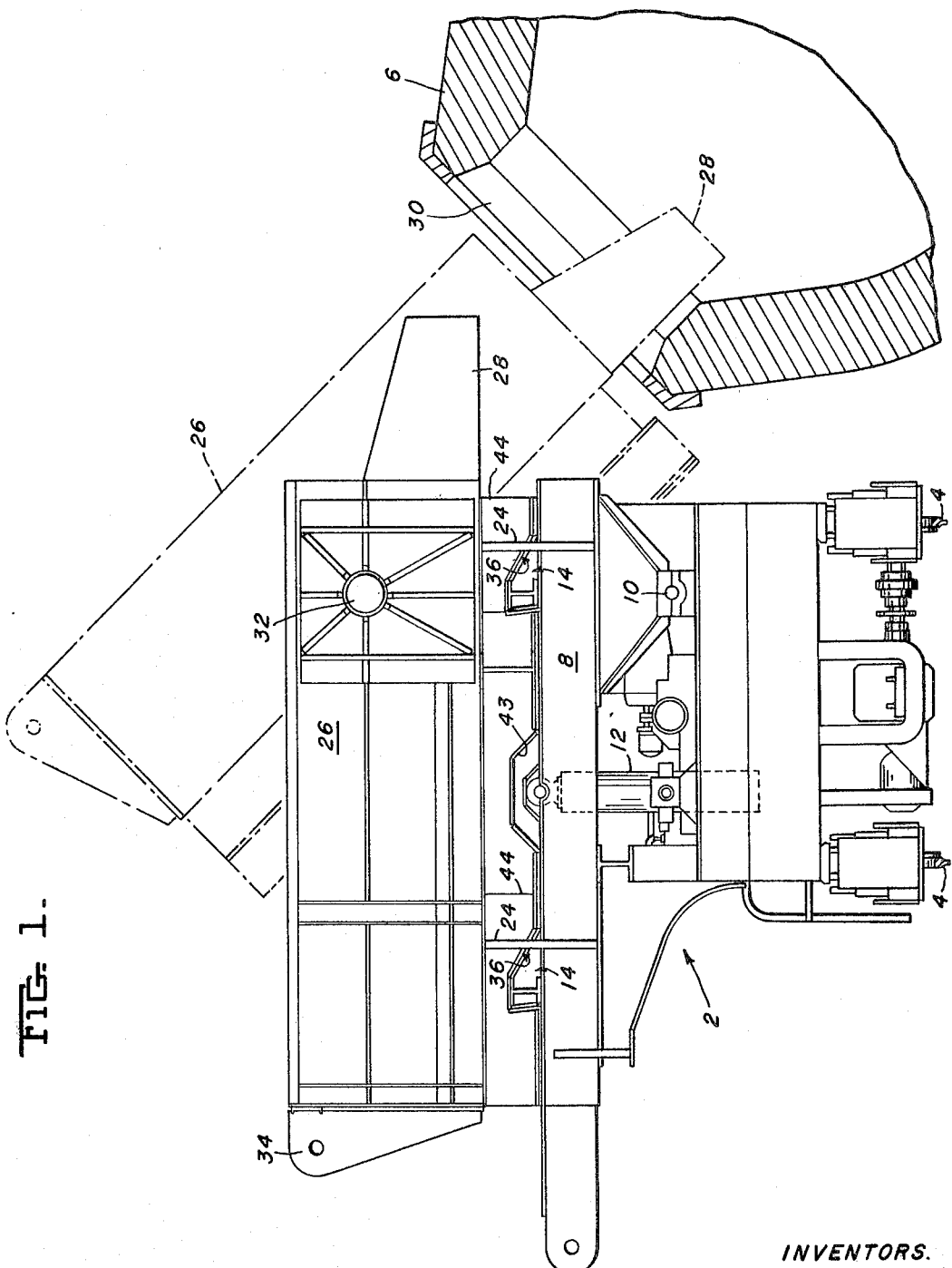

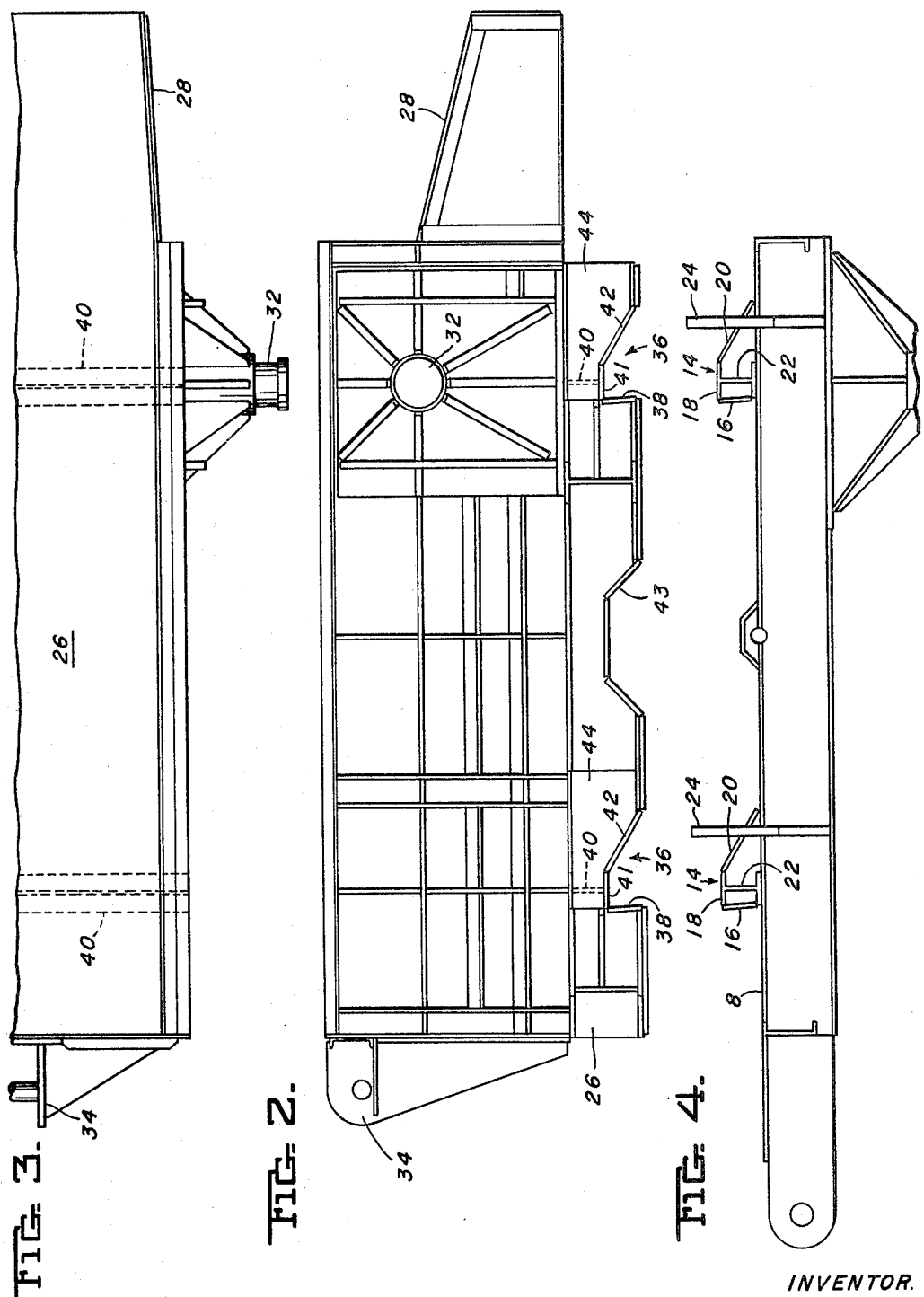

3,266,649
APPARATUS FOR CHARGING SCRAP INTO A STEELMAKING VESSEL
Harry H. Britcher, Jr., and Louis C. Buterbaugh, Johnstown, Pa., assignors to United States Steel Corporation, a corporation of Delaware
Filed Oct. 7, 1964, Ser. No. 402,250
3 Claims. (Cl. 214—314)

The present invention relates generally to material-handling equipment and, more particularly, to an improved scrap-charging box especially suitable for charging cold metal scrap into an oxygen steelmaking vessel.

The scrap-charging equipment in a typical oxygen steelmaking plant usually consists of a track-mounted charging car having one or more tilting frames on each of which is monuted a scrap-charging box. In operation, the scrap box is loaded with a predetermined amount of scrap at a location remote from the charging car and then placed upon tilting frame of the car by an overhead crane. The car is then moved into position adjacent the oxygen steelmaking vessel. The car is of such a height that the discharge spout at one end of the scrap box is disposed above the mouth of the vessel when the car is in charging position. After the car has been placed in charging position, the vessel, which is generally similar in shape to a Bessemer converter, is tilted slightly to present its mouth for charging. The tilting frame is then pivoted to tilt the scrap box and cause its contents to be dumped through its discharge spout into the mouth of the vessel. Subsequent to the scrap-charging operation, the tilting frame and the scrap box are returned to normal horizontal position and the charging car is moved away from the vessel.

Prior to our invention, one of the problems inherent in the scrap-charging operation just described was preventing the scrap box from sliding off the tilting frame when it was uptilted. This problem was aggravated by the fact that the bottom of the scrap box had to be relatively flat due to the necessity of placing the box on the mill floor and on a scale platform for loading and weighing, respectively.

Another matter of primary concern resides in guiding and aligning the box relative to the tilting frame as the box was lowered into position onto the charging car by the overhead crane. The boxes are relatively large, having capacities upwards of seventy-five tons, so that the view of the crane operator was somewhat obscured during placement of the scrap box on the tilting frame of the charging car.

It is, accordingly, the primary object of our invention to provide an arrangement whereby a scrap box can be guided to and retained on the tilting frame of a charging car.

It is a more-specialized object of our invention to provide an arrangement as set forth by the above object wherein the underside of the scrap box is provided with at least one transverse recess which mates with and engages an upstanding transverse rib on the upper surface of the tilting frame.

As a corollary to the above object, it is another object of our invention to provide the recess and rib with mating, inclined, interengaging surfaces whereby the box is retained on the frame when the frame is uptilted.

It is another object of our invention to provide a recess and rib arrangement as set forth by the above objects wherein the outline of the end of the recess is visible on each side of the box and the outline of the end of the rib is visible on each side of the frame whereby the crane operator can be guided in placing the box on the frame.

It is a further object of our invention to provide an arrangement as set forth by the foregoing objects wherein guide members having downwardly converging surfaces are provided on opposite sides of the tilting frame for guiding the box laterally as it is being lowered onto the charging car.

These and other objects will become more apparent after referring to the following specification and attached drawings, in which:

FIGURE 1 is a side elevational view showing a scrap box and tilting frame arranged on a charging car adjacent a steelmaking vessel in accordance with our invention;

FIGURE 2 is a side elevational view of a scrap box constructed in accordance with the invention;

FIGURE 3 is a partial plan view of FIGURE 2;

FIGURE 4 is a side elevational view of a tilting frame constructed in accordance with the invention;

Figure 5:
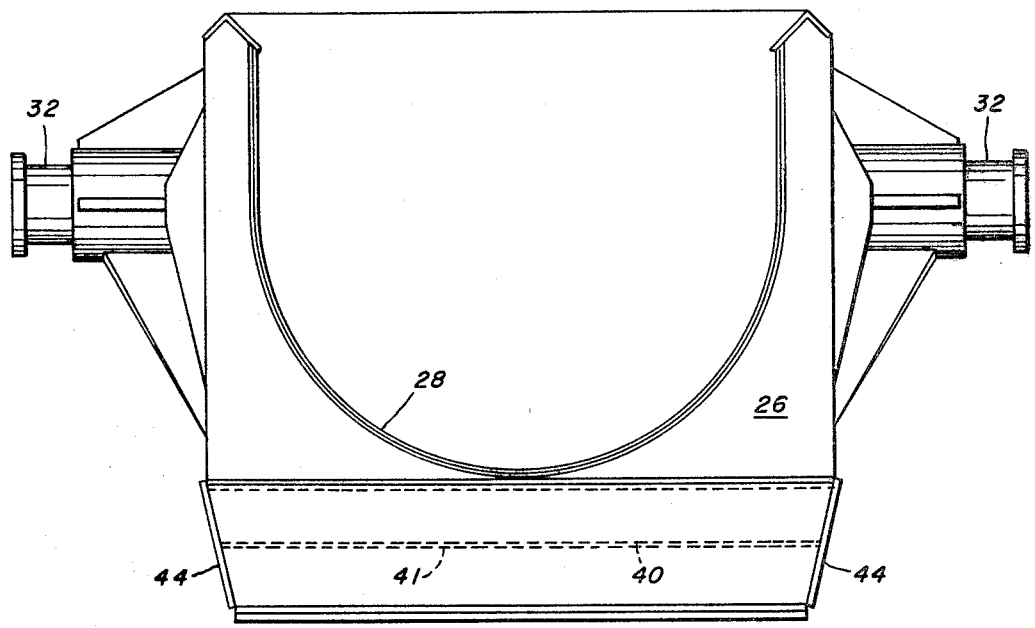
FIGURE 5 is an end view looking at the right end of FIGURE 2.
Figure 6:
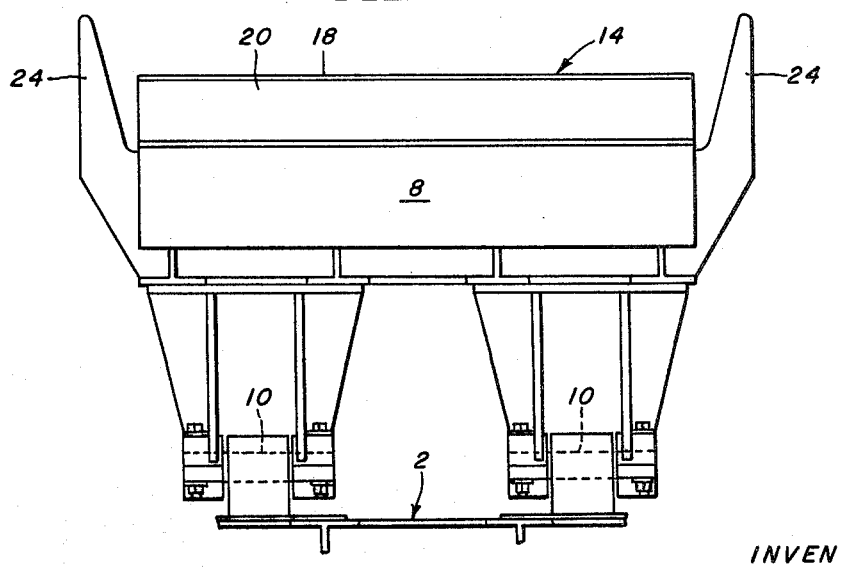
FIGURE 6 is an end view looking at the right end of the tilting frame and its mounting in FIGURE 1.

Referring more particularly to the drawings, reference numeral 2 designates generally a charging car which is wheel mounted for movement along rails 4 on the charging floor of an oxygen steelmaking facility adjacent a steelmaking vessel 6. A tilting frame 8 is pivoted adjacent one end to a pair of aligned shafts 10 in the upper portion of the charging car. The shafts 10 extend lengthwise of the craging car adjacent the side thereof toward the vessel 6, and the tilting frame 8 extends transversely across the top of the charging car. A hydraulic cylinder 12 is pivotally mounted on the car 2 and connected by its piston rod with the tilting frame 8 for pivoting the same about the shafts 10.

An upstanding rib 14 extends transversely across the upper surface of the tilting frame adjacent each end thereof. The ribs 14 are parallel with each other; and each is generally trapezoidal in cross section, formed with an upstanding back plate 16, a top plate 18 and a sloping front plate 20. The top plate 18 of each rib is formed by the to flange of an H-beam structural section 22. The back plate 16, at its upper edge, abuts and is welded to the edge of the top flange of the H-beam, while its lower edge rests on and is welded to the bottom flange of the H-beam inwardly of the flange edge. Thus, each of the back plates 16 is inclined upwardly and away from the pivoted end of the tilting frame 8. The front plate 20 of each rib slopes forwardly from the forward edge of the top plate at an angle of approximately 30 degrees to the upper surface of the tilting frame.

An upright, lateral guide member 24 is rigidly attached to the side of the tilting frame at the end of each rib 14 and projects upwardly from the upper surface of the frame adjacent the forward edge of the rib.

Reference numeral 26 designates generally the scrap box of the appaartus of the invention. Box 26, which is adapted to rest on the tilting frame 8, as will be more fully described, has an open top and is substantially rectangular in shape with a discharge spout 28 at one end to fit into the mouth 30 of the vessel 6. A pair of trunnions 32 projects from opposite sides of the box adjacent its spout end and a bracket 34 is formed on its opposite end for engagement by the hooks of an overhead crane (not shown) for lifting the box from the loading floor to the charging car and vice versa.

The bottom of the box 26 is generally flat so that it rests in upright position when deposited on a loading floor, scale platform or any other flat surface. A pair of spaced, transversely extending, parallel recesses 36 is provided in the bottom of the box 26 which mates with the pair of upstanding ribs 14 on the tilting frame 8. Similary to the ribs 14, each of the recesses 36 is formed with a back plate 38, which is inclined upwardly and away from the spout end of the box; a top plate 41; and a front plate 42, which slopes forwardly and downwardly in the direction toward the spout end of the box at an angle of approximately 30 degrees to the box bottom. The top plate 41 is formed by the bottom flange of an H-beam 40, which extends transversely across the width of the bottom of the box.

A transverse recess 43 may be provided in the box bottom between the recesses 36 to provide space for the distal end of the piston rod of the cylinder 12.

It will be noted that the ribs 14 and recesses 36 extend completely across the tilting frame and box bottom, respectively, so that the ends thereof are clearly visible from the sides of the box and frame and, therefore, would be in the view of the crane operator looking at the box and frame from the side when the box is being lifted onto the charging car.

In operation, the box 26 is loaded with a predetermined amount of cold steel scrap and then carried by an overhead crane to a position above the charging car 2 from whence it is lowered onto the tilting frame 8 between the lateral guide members 24. The inner surfaces of the guide members 24 are inclined inwardly and downwardly so as to facilitate guiding of the box 26 onto the tilting frame. Inclined side plates 44 are provided on opposite sides of the bottom of box 26 adjacent the ends of the recesses 36 for engagement with the inner surfaces of the guide members 24.

During the lowering operation, the ends of the recesses and ribs toward the crane cab serve as guides of the crane operator. The sloping surfaces formed by the mating front plates 20 and 42 permit gradual easing of the box into proper position on the tilting frame without the necessity of pinpointing the box into exact position when it is lowered onto the frame.

Then, during the scrap-charging operation, the charging car 2 carrying the loaded scrap box 26 is moved into position adjacent the vessel 6, as shown in FIGURE 1. The vessel 6 is then tilted toward the charging car; and the tilting frame 8 is pivoted by the hydraulic cylinder 12 on the car to tilt the box and lower its discharge spout into the mouth of the vessel, as shown by broken lines in FIGURE 1. The scrap contents of the box then slide into the vessel 6, after which the tilting frame is lowered to return the scrap box to normal horizontal position on the car.

The mating inclined surfaces provided by the back plates 16 and 38 insure that the box 26 will be positively retained on the tilt frame 8 during the scrap-charging operation.

Although we have shown two recesses in the bottom of the box and two mating ribs on the tilting frame, it will be understood that more or less than this number can be used if desired.

While one embodiment of our invention has been shown and described, it will be apparent that other adaptations and modifications may be made without departing from the scope of the following claims.

We claim.

1. In a material-handling apparatus, the combination with a generally horizontal frame tiltable about a transverse axis adjacent one end, of a box having a discharge spout at one end removably disposable on said frame so the spout will be below the remainder of the box when the frame is uptilted, said frame having a transverse rib upstanding thereon, and said box having a transverse recess in the bottom thereof adapted for mating engagement with said rib, the surface of said rib remote from said axis slopping upwardly away from the latter and the surface of said recess remote from said spout sloping upwardly away from the latter.

2. In a material-handling apparatus, the combination as defined by claim 1 in which the outline of the end of said recess is visible on each side of said box and the outline of the end of said rib is visible on each side of said frame.

3. In a material handling apparatus, the combination as defined in claim 1 including upstanding members on opposite sides of said frame having downwardly converging surfaces for laterally guiding said box onto said frame.

References Cited by the Examiner

UNITED STATES PATENTS

| | | | |
|---|---|---|---|
| 2,836,309 | 5/1958 | McFeaters | 214—18 |
| 3,146,901 | 9/1964 | McDowell et al. | 214—18 |

GERALD M. FORLENZA, *Primary Examiner.*

R. SHERIDAN, *Assistant Examiner.*